United States Patent
Gouthiere

(12) 
(10) Patent No.: US 6,603,099 B2
(45) Date of Patent: Aug. 5, 2003

(54) MULTIFUNCTION ELECTRICAL COOKING APPLIANCE

(75) Inventor: Christophe Gouthiere, Rumilly (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/821,901

(22) Filed: Mar. 30, 2001

(65) Prior Publication Data

US 2001/0045422 A1 Nov. 29, 2001

(51) Int. Cl.[7] .................................................. A47J 37/00
(52) U.S. Cl. ........................ 219/432; 219/401; 219/403; 219/433; 219/450.1; 99/339; 99/340
(58) Field of Search .................................. 219/386, 393, 219/401, 428, 429, 432–33, 435–36, 438, 450, 450.1, 472, 474; 99/339–40, 403, 410, 413, 415–418, 421 R, 421 H, 422, 425–26, 444–48

(56) References Cited

U.S. PATENT DOCUMENTS

| | | | |
|---|---|---|---|
| 2,742,850 A | 4/1956 | LaFond | |
| 3,489,267 A | 1/1970 | Carpenter | |
| 4,331,251 A | * 5/1982 | Berman et al. | 220/48 |
| 5,782,165 A | * 7/1998 | Glenboski et al. | 99/340 |

FOREIGN PATENT DOCUMENTS

| | | | |
|---|---|---|---|
| DK | 37 31 352 A | | 4/1989 |
| GB | 2 256 788 A | | 12/1992 |
| GB | 2256788 | * | 12/1992 |
| GB | 2 270 459 A | | 3/1994 |

* cited by examiner

Primary Examiner—Teresa Walberg
Assistant Examiner—Shawntina Fuqua
(74) Attorney, Agent, or Firm—Harness, Dickey & Pierce, P.L.C.

(57) ABSTRACT

The appliance comprises a heater base, at least two removable cooking receptacles capable of being centered and held on said heater base, one of them being constituted by a leakproof pan and the other by a grill plate, and also a removable lid adapted to close the top portion of said pan so as to make up a cooking enclosure. The grill plate is provided with at least one through orifice and has means enabling it to be positioned above said pan in order to perform steam cooking in said cooking enclosure. The appliance is applicable to cooking.

11 Claims, 2 Drawing Sheets

MULTIFUNCTION ELECTRICAL COOKING APPLIANCE

FIELD OF THE INVENTION

The present invention relates to a multifunction electrical cooking appliance.

The technical field of the invention is that of cooking appliances of the type that use a common heater base to combine functions such as fryer and grill, or grill and steam cooker.

BACKGROUND OF THE INVENTION

The heater base generally comprises a slab enabling removable cooking receptacles to be centered and held, together with heater means, either in the form of a resistance element positioned over a reflector, or else external thereto.

Electrical fryers are known that are sold in particular in the United States as "skillets". Some of them include a grill version, giving the options of browning and of grilling.

Cooking appliances are also known such as that described in patent application GB 2 256 788 in which the heater base is constituted by a support having a central opening for receiving heat externally as given off by the flame of a gas appliance; the heater base can receive two types of removable cooking support element, one of which is a pan and the other of which is a grill capable of being used separately or in combination, with or without a lid, thus enabling various types of cooking to be performed, and in particular including steam cooking.

OBJECTS AND SUMMARY OF THE INVENTION

The invention seeks to enlarge and improve the uses and functions of appliances of those types while also ensuring that the elements occupy a minimum amount of space in storage.

Thus, the appliance in question comprises, in conventional manner, a heater base, at least two removable cooking support elements capable of being centered and held on said heater base, one of them being constituted by a pan and the other by a grill plate with a smooth or grooved bottom, and a removable lid suitable for closing the top portion of said pan or grill plate so as to make a cooking enclosure.

Said grill plate is provided with at least one through orifice and has means enabling it to be positioned over said cooking pan in order to perform steam cooking inside said cooking enclosure.

According to the invention, said heater base includes an electrical resistance and said lid, said cooking pan, said grill plate, and said heater base are nestable one in another.

The grill plate performs its primary function as a grilling support with the through orifice allowing cooking juices and fat to flow through it to a collecting receptacle situated beneath.

Alternatively, when the grill plate is positioned above the pan, inside the cooking enclosure, in other words when the pan is closed by the lid, then the grill plate serves as a support for food that is to be subjected to steam cooking. Once the pan has been filled with the water required for this method of cooking, the through orifice in the grill plate then serves to pass the steam that results from the water in the pan boiling.

The appliance of the invention is thus transformable so as to be capable of constituting any one of the following three structures supported by said heater base:

1) a fryer made up of said pan optionally closed by the lid;
2) a grill made up of said grill plate, optionally closed by the lid, and of a receptacle for collecting cooking juices and placed beneath it; and
3) a steam cooker made up of said pan, said grill plate closed by the lid being positioned above said pan.

Preferably, the grill plate has multiple orifices so that the hot steam comes directly into contact with the food, e.g. vegetables or fish, as supported by the grill plate and prior to being distributed throughout the top portion of the enclosure, i.e. the volume that is available between the top surface of the grill plate or the food and the top of the lid.

In addition, since the appliance and its accessories can be nested in one another they present a reduced requirement for space both while in use and during storage; preferably all of the accessories, namely the lid, the cooking pan, and the grill plate are receptacles whose hollow shapes can thus be nested in one another, with their main walls being superposed and possibly even coming directly into contact one on another so as to reduce the space occupied by said accessories in storage.

Thus, in a preferred embodiment, the grill plate has a flared side wall of S-shaped section forming two successive rims, namely an inner, first rim adapted firstly to bear against a rim of the heater base for the grill function and secondly to support a bearing surface of the lid for the grill function and for steam cooking, and an outer, second rim adapted to bear against an outer rim of the pan when operating as a steam cooker.

In this manner, the grill plate can perform its two functions, one in a low position supported by the heater base and the other in a high position supported by the cooking pan, the lid resting on said inner or first rim of the grill plate.

In the high position, because its outer rim bears against the outer rim of the cooking pan, the grill plate is positioned inside the volume that is defined by the pan. When the two receptacles are stacked in this way there is therefore no additional volume requirement, since the volume of the enclosure remains identical in frying mode and in steam cooking mode.

Other features and advantages will appear in the light of the following description of a preferred embodiment of the invention given by way of a non-limiting example.

MORE DETAILED DESCRIPTION

Figure 1:
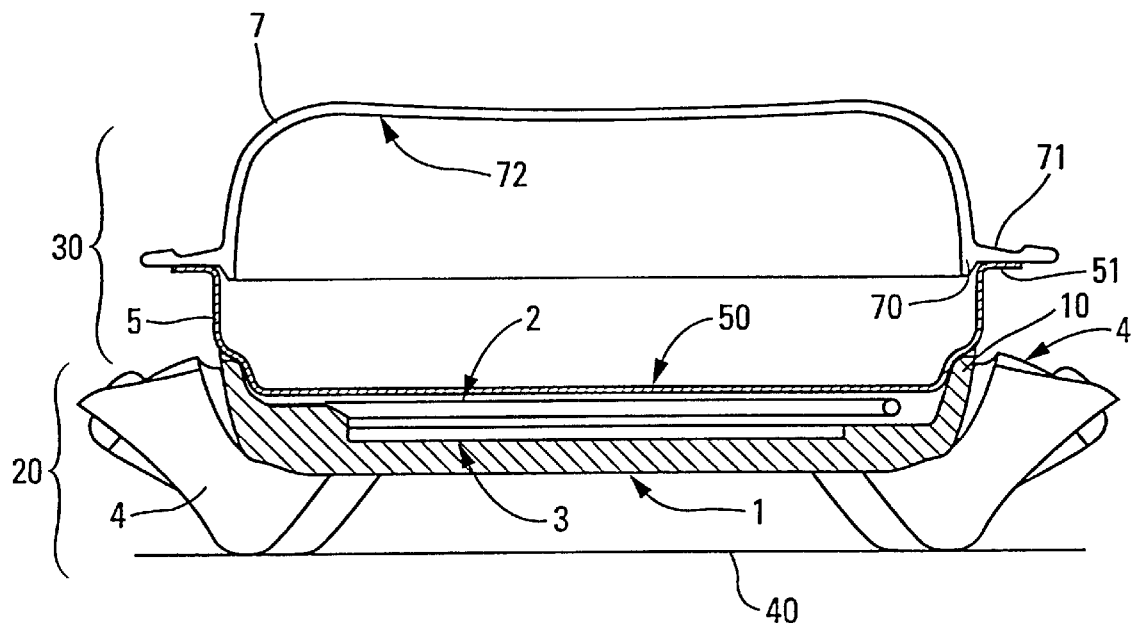
FIG. 1 is a section view of an appliance in accordance with the invention, the cooking enclosure being arranged in frying mode.

The appliance comprises a heating base 20 comprising a slab 1 made of steel or of a plastics material that withstands heat, having an electrical resistance 2 fixed over the bottom thereof so as to be disposed in substantially circular manner above a reflector 3 for upwardly radiating heat from the resistance. Side walls 10 project upwards from the bottom to serve as a support for the removable cooking receptacles of the appliance.

The electrical resistance 2 is connected to a socket suitable for being connected to electricity mains via a power supply cord (not shown).

The walls of the slab 1 have handles 4 fixed thereto that also serve as legs to enable it to stand on a work surface or table 40, and possibly containing members for performing temperature regulation, a thermostat, and a safety switch for the appliance.

The top portions of the vertical walls 10 of the slab 1 serve to center and hold various removable receptacles of the appliance, in particular a cooking pan 5 and a grill plate 6 having respective bottoms 50 and 60 that are complementary in shape to the top portions of the vertical walls 10 that are to support them.

Figure 3:
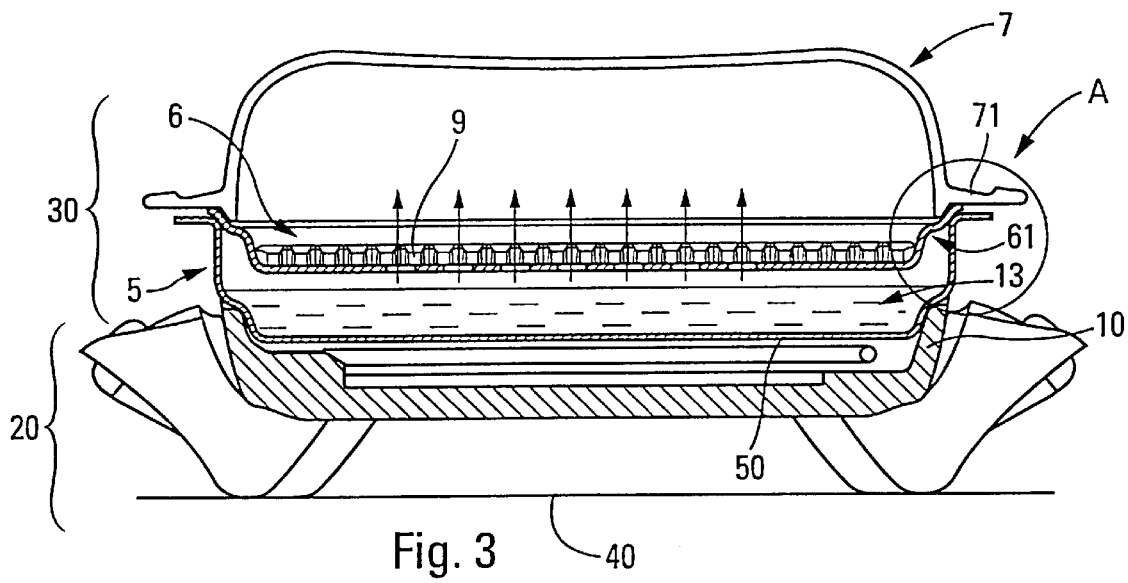
FIG. 3 is a section view of the FIG. 1 appliance, the cooking enclosure being in steam cooker mode after the grill plate has been interposed therein.

The cooking pan 5, e.g. made of aluminum with a non-stick internal coating or a coating of any other suitable material, can be closed on top by a lid 7 (preferably made of glass) that is shaped like an upside-down pan, and with which the pan constitutes a cooking enclosure 30 when operating in frying mode (see FIG. 1) or in steam cooker mode (see FIG. 3).

The grill plate 6 which is in the form of a shallow receptacle, e.g. made of aluminum with a non-stick internal coating, has parallel ribs 8 on the top surface of its bottom 60, and some of the ribs 8 are pierced in various locations by orifices 9 that are distributed over at least the center of the bottom 60, if not over the entire bottom 60.

Figure 2:
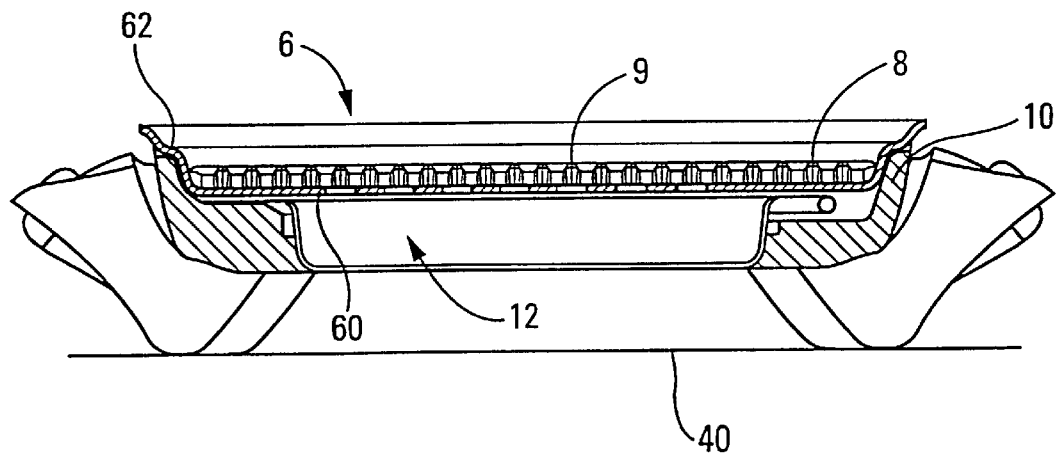
FIG. 2 is a section view of the FIG. 1 appliance, the cooking enclosure being replaced by accessories suitable for performing the grill function.

When performing the grill function (see FIG. 2), these orifices 9 allow cooking juices and fat to flow into a collecting receptacle 12 placed beneath it, on the bottom of the slab 1.

In the steam cooker function, the cooking enclosure 30 includes the grill plate 6 which is placed over the bottom 50 of the pan 5. The pan 5 is filled with water 13 so the orifices 9 then allow steam to pass through, rising from the surface of the boiling water and coming directly into contact with the food placed on the grill plate 6, as represented by arrows in FIG. 3.

Figure 4:
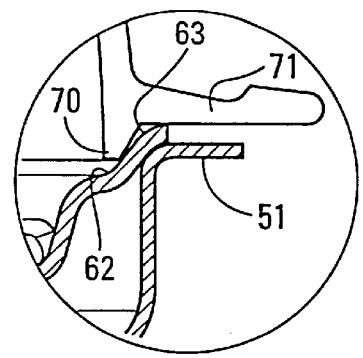
FIG. 4 is an enlarged view showing a detail A of FIG. 3.

The grill plate 6 is suspended in the volume defined by the pan 5 above its bottom 50. For this purpose, the grill plate 6 has a peripheral vertical wall 61 that flares with an S-section so as to define two successive rims:

With reference to FIG. 4, an inner, first rim or edge 62 forms a step in the wall 61 and its bottom surface is shaped so as to bear on the top portion of the side walls 10 of the slab 1 and its top surface is shaped to support a bearing surface 70 of the lid, while an outer, second rim or edge 63 is adapted to bear on a peripheral outer rim or handle-forming rim 51 of the cooking pan 5.

At its base, the lid 7 has a peripheral outer or handle-forming rim 71 which, when the appliance is in frying mode (see FIG. 1), bears on the outer rim 51 of the cooking pan so as to close it.

In steam cooking mode (see FIGS. 3 and 4), the outer rim 71 of the lid, by bearing against the outer rim 51 of the pan after the grill plate 6 has been interposed, acts under gravity to clamp the outer rim 63 thereof, thus compensating for the thrust that it exerts on the inner rim 62.

Such surface co-operation between the lid 7, the edge of the pan 5, and the edge of the grill plate 6 serves not only to secure the lid 7 and the grill plate 6 securely suspended in the inside volume defined by the pan 5, but also provides good sealing for the cooking enclosure 30 so as to allow the temperature of the water to rise more quickly.

Figure 5:
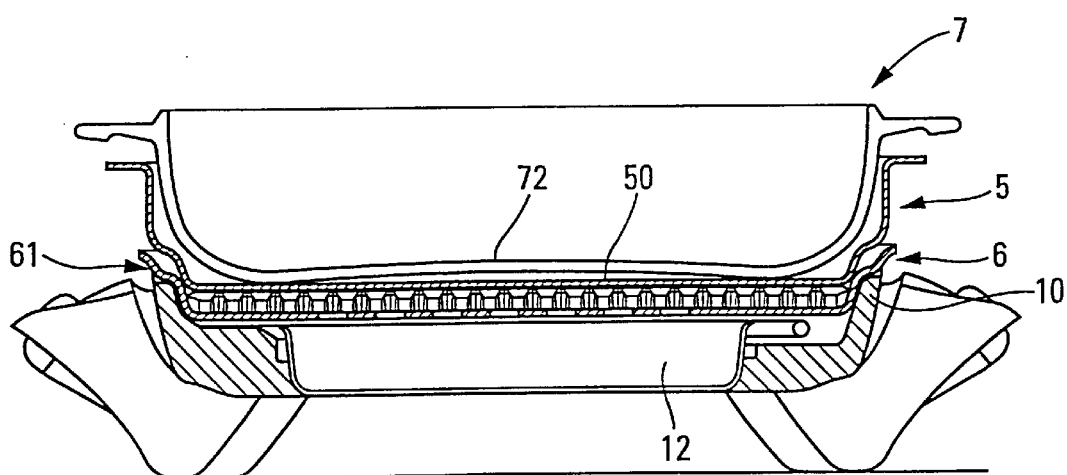
FIG. 5 is a section view of the appliance of the invention in a storage configuration after its various accessories have been stacked on the heating base.

In complementary manner, the flared shape of the vertical wall 61 of the grill plate 6 makes it possible when the various accessories making up the appliance are being put away for storage, for the grill plate 6 to receive the bottom 50 of the cooking pan 5, as shown in FIG. 5.

When the appliance and its various accessories are to be put away, it is initially prepared as though it were going to perform the grilling function (see FIG. 2), with the receptacle 12 for collecting cooking juices resting on the bottom of the slab 1, and with the grill plate 6 bearing against the rim 10 of the slab 1.

Then the cooking pan 5 has its bottom 50 nested in the grill plate 6, after which the lid 7 is put into place upside-down in the pan so that its main wall 72 is received inside the cooking pan 5 (see FIG. 5); when stored in a different configuration, the appliance can be prepared as for operating in frying mode by placing the cooking pan 5 initially into place so that its bottom 50 nests in the slab 1 and bears against the rim 10 thereof; after which the lid 7 is placed upside-down in the pan so that its main wall 72 is received in the cooking pan 5, and then the grill plate 6 is the last to be put into place on and in said lid 7.

The shapes of the accessories enable them to be stacked conveniently so that when stored the appliance occupies a minimum amount of space, and less space than that occupied by the appliance in operation with only a fraction of its accessories, whether in frying mode or in steam cooking mode, since the cooking enclosure is then built up.

Because of the upside-down pan shape of the lid it is also suitable for use in an oven as a cooking dish.

A multifunction electrical cooking appliance is thus provided which, together with two removable receptacles and various combinations thereof, can perform three functions: (a fryer for browning, a grill for grilling, and a steam cooker or fish kettle), and which is easy to store because of the way in which its receptacles and its lid can be successively nested and stacked in one or other order on said slab 1.

Naturally, the invention is not limited to the embodiment described, and numerous variants can be envisaged without going beyond the ambit of the invention.

For example, instead of being suspended inside the cooking pan by an outer rim, the grill plate could be placed inside the cooking pan via an independent spacer or on legs secured to the bottom of the plate, so as to be held above the depth of water required for steam cooking.

What is claimed is:

1. A multifunction cooking appliance comprising
   a heater base including an electrical resistance;
   at least two removable cooking support elements capable of being centered and held on said heater base, one of them being constituted by a pan and the other by a grill plate provided with at least one through orifice; and
   a removable lid suitable for closing the top portion of said pan so as to make a cooking enclosure;
   said grill plate having means enabling it to be positioned over said pan in order to perform steam cooking inside said cooking enclosure;
   said heater base, said cooking pan, said grill plate and said lid in a lid position being nestable one in another when said cooking appliance is in a cooking configuration and said heater base, said cooking pan, said grill plate and said lid in an upside down position being nestable one in another when said cooking appliance is in a storage configuration;

wherein said lid is in the form of an upside down pan which enables it to be used as a cooking dish.

2. An electrical cooking appliance according to claim 1, the appliance being transformable so as to be capable of constituting any one of the three following structures supported by said heater base:

1) a fryer made up of said pan optionally closed by the lid;
2) a grill made up of said grill plate, optionally closed by the lid, and of a receptacle for collecting cooking juices and placed beneath it; and
3) a steam cooker made up of said pan, said grill plate closed by the lid being positioned above said pan.

3. An electrical cooking appliance according to claim 1, wherein the grill plate is provided with multiple orifices.

4. An electrical cooking appliance according to claim 3, wherein the orifices pass through ribs formed on the top surface of the grill plate.

5. An electrical cooking appliance according to claim 1, wherein the grill plate has a rim bearing against a rim of the pan so as to enable it to be suspended inside the volume defined by the pan.

6. An electrical cooking appliance according to claim 1, wherein the grill plate has a side wall forming a step for supporting and laterally retaining the lid.

7. An electrical cooking appliance according to claim 1, wherein the grill plate has a flared side wall of S-shaped section, so as to form two successive rims, namely an inner or first rim suitable for bearing against a rim of the heater base and for supporting a bearing surface of the lid, and an outer or second rim adapted to bear against an outer rim of the cooking pan.

8. An electrical cooking appliance according to claim 7, wherein the base of the lid has an outer rim suitable for bearing against said outer rim of the cooking pan in order to close it and to clamp by gravity said outer rim of the grill plate when bearing against said outer rim of the cooking pan.

9. An electrical cooking appliance according to claim 1, wherein the lid is capable of nesting its main wall in said cooking pan which can itself be nested via its bottom in the grill plate.

10. An electrical cooking appliance according to claim 1, wherein said cooking pan, said grill plate and said lid are receptacles whose hollow shapes are adapted to be nested in another, with their main walls being superposed when said cooking appliance is in a storage configuration.

11. An electrical cooking appliance according to claim 1, wherein said lid has a main wall and a downward extending wall, the lower peripheral edge of which comprises an outer rim allowing nesting of said lid with said heater base, said cooking pan and said grill plate when said lid is in its upside-down position.

* * * * *